Oct. 12, 1971     D. P. MAURER ETAL     3,611,738
FROZEN PRODUCT REFRIGERATION AND DEHUMIDIFICATION SYSTEM

Filed April 15, 1970     3 Sheets-Sheet 1

INVENTORS
GERARD F. HAGENBACH
DAVID P. MAURER
BY
John C. LeDiver
ATTORNEY

United States Patent Office 3,611,738
Patented Oct. 12, 1971

3,611,738
FROZEN PRODUCT REFRIGERATION AND DEHUMIDIFICATION SYSTEM
David P. Maurer, Williamsville, and Gerard F. Hagenbach, Tonawanda, N.Y., assignors to Union Carbide Corporation, New York, N.Y.
Filed Apr. 15, 1970, Ser. No. 28,662
Int. Cl. F25d 25/00
U.S. Cl. 62—64                                         10 Claims

ABSTRACT OF THE DISCLOSURE

A mobile storage chamber refrigeration and dehumidification system and method for removing moisture from the chamber atmosphere and chamber and storage product surfaces employing a pressurized liquefied refrigerant gas which is vaporized within a heat exchanger located within the mobile chamber and dispensed thereafter through overhead spray conduit means. A fan passes the chamber moisture-laden atmosphere over said heat exchanger causing frost to build up on same while dehumidifying such circulated chamber atmosphere. Such frost is periodically melted and removed from said mobile chamber, while refrigeration is maintained within such chamber by means of a bypass conduit which provides for refrigerant flow from its storage container to said overhead spray conduit without passing through said heat exchanger.

---

This invention relates to a method of and an apparatus for dehumidifying mobile storage chambers and in particular to chambers which maintain frozen product within chamber temperature limits of about —10° F. to 40° F.

Intransit refrigeration systems employing liquefied refrigerant gas which is sprayed into a product storage chamber are well known in the art, see Kane et al., U.S. Pat. No. 3,287,925. As is the case generally with refrigerating stored product, moisture which collects within the refrigeration chamber often has undesirable effects on the stored product. In such cases, removal of moisture is extremely desirable, and for intransit refrigeration systems employing liquefied gas refrigerant for storage chamber temperature regulation at above freezing temperatures, a system has been devised for humidity removal, see Maurer et al., U.S. Pat. No. 3,492,831.

Frost formation in mobile storage chambers carrying frozen product is still a problem. Repeated door openings such as occur in multi-stop delivery service cause moisture introduction through the chamber doors when opened. Such moisture deposits as frost or ice on the chamber walls and stored product, which may cause product boxes to stick together and in some cases may also produce wet boxes which lose structural strength and become difficult to handle.

It is an object of this invention to provide a method of and apparatus for maintaining conditions of low humidity in liquefied refrigerant gas refrigerated mobile storage chambers operated at near and below freezing temperatures.

Other objects will be apparent from the disclosure and appended claims.

SUMMARY OF THE INVENTION

The objects of this invention are accomplished by a method for frozen product refrigeration and dehumidification comprising the steps of:

(a) Providing pressurized low boiling liquefied gas having a boiling point at atmospheric pressure below about —20° F. in a thermally insulated storage container associated with a storage chamber closed from the atmosphere and holding product at least partially surrounded by a gas space;

(b) Monitoring the gas temperature within said storage chamber;

(c) Dispensing cold liquid from said storage container in response to the monitored gas temperature; heat exchanging the dispensed cold liquid with circulating warmed gas in said storage chamber to simultaneously at least partially vaporize said liquid and partially warm the resulting vapor, and condensing moisture from said gas in the form of frost while cooling said gas to temperature below about 32° F.; and spraying said at least partially vaporized liquid as a multiplicity of discrete streams into said storage chamber to maintain said monitored gas temperature in a selected temperature range of —10° F. to about 40° F.;

(d) Circulating the moisture-depleted cooled gas in contact with frozen product in the storage chamber for evaporative moisture transfer to the gas and warming thereof, and refrigeration of said frozen product;

(e) Recirculating the moisture-added warmed gas to the heat exchanging step (c) as said warmed gas;

(f) Periodically terminating said heat exchanging of (c), directly spraying the dispensed cold liquid as said multiplicity of discrete fluid streams into said storage chamber;

(g) Simultaneously with (f), melting the frost formed in (c) during the preceding heat exchanging, and collecting and discharging the melted frost from said storage chamber; and (h) After discharging said melted frost, terminating said melting of (g) and restoring said heat exchanging of (c).

Other objects of this invention are accomplished in a system for the intransit refrigeration and dehumidification of frozen product comprising:

(a) A storage chamber for said frozen product;

(b) A thermally-insulated container associated with the storage chamber for storing pressurized low boiling liquefied gas having a boiling point at atmospheric pressure below about —20° F.;

(c) Spray conduit means positioned within the upper portion of said storage chamber and extending substantially the entire length thereof with openings spaced along the conduit for discharging a multiplicity of discrete cold fluid streams into the storage chamber for refrigerating the frozen product;

(d) Liquid discharge conduit joined at one end to said container;

(e) Heat exchange passage means having an inlet end joined to the other end of said liquid discharge conduit means;

(f) Vapor discharge conduit means having an inlet end joined to the discharge end of said heat exchange passage means and having an outlet end joined to said spray conduit means;

(g) Bypass conduit means having an inlet end joined to the liquid discharge conduit means intermediate said one end of (d) and said other end of (e), said bypass conduit means having an outlet end joined to the inlet end of said spray conduit means;

(h) Liquefied gas flow control means comprising a temperature sensing element positioned within said storage chamber, a discharge conduit control valve operably interposed in said liquid discharge conduit intermediate said other end and said bypass conduit means inlet end being connected to said temperature sensing element to be responsive to the storage chamber temperature sensed by such element;

(i) A bypass control valve operably interposed in said bypass conduit being connected to the temperature sensing element of (h) to be responsive to the storage chamber temperature as sensed by such element;

(j) Enclosure means having walls partially surrounding and spaced from said heat exchange passage means;

(k) Fan means positioned adjacent to and in flow communication with said enclosure means for circulating gas therethrough and thereafter substantially from end-to-end of said storage chamber;

(l) A water collector positioned within said storage chamber beneath the heat exchange passage means;

(m) Water drain means joined to said water collector and extending to outside said storage chamber;

(n) Electrical defrost means disposed in contact with said heat exchange passage means;

(o) Bypass conduit flow, discharge conduit flow, fan and electrical defrost control means comprising a frost build-up sensing element and a temperature sensing element within the heat exchange passage means enclosure, which sensing elements are operably connected to said electrical defrost means, bypass control valve, discharge conduit control valve and fan means, such that they are responsive to sensed frost build-up which is sensed by said frost build-up sensing element and which initiates defrosting, and they are responsive to defrost sensed by said temperature sensing element which terminates defrosting.

DETAILED DESCRIPTION

Figure 1:
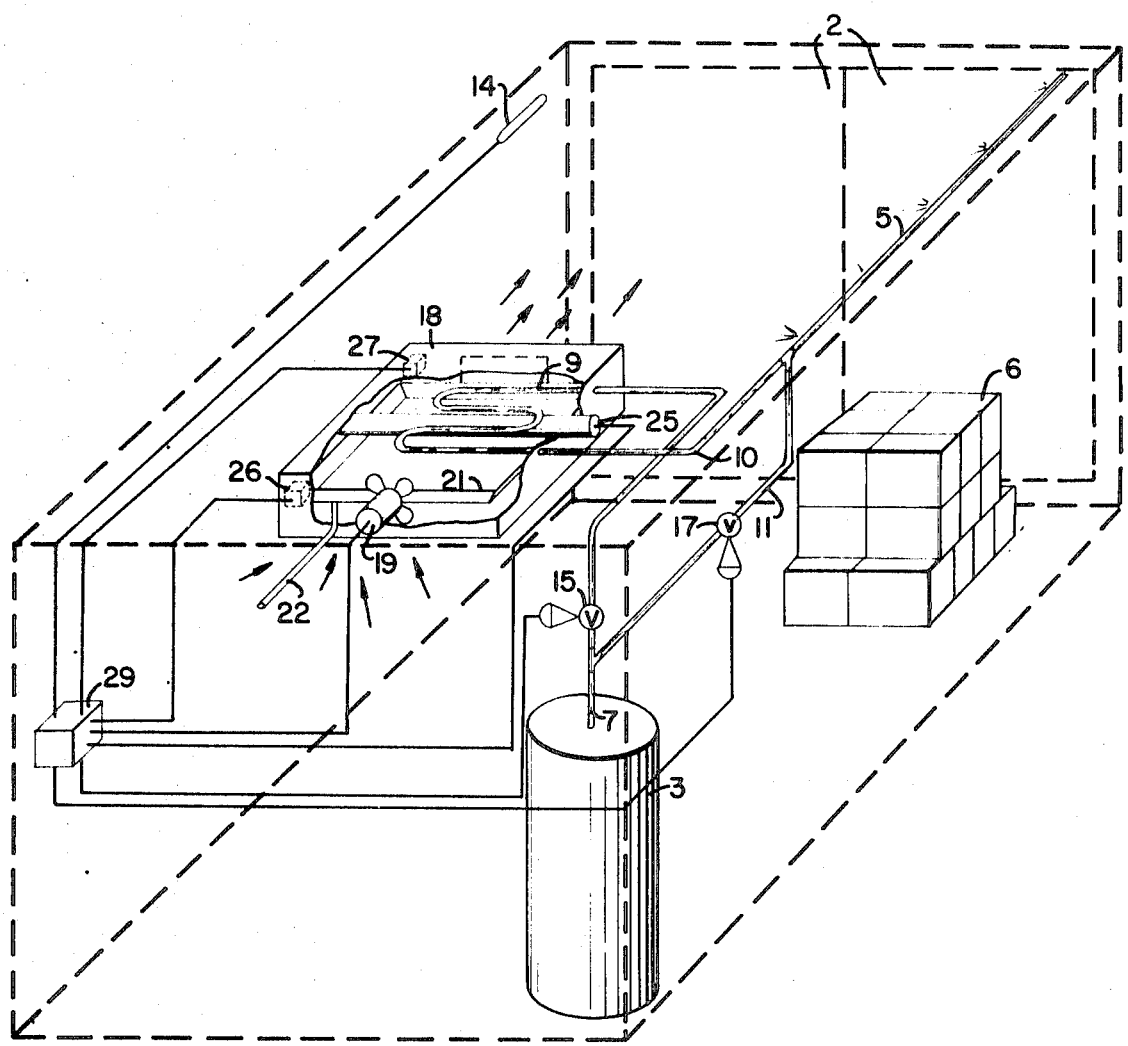
FIG. 1 is a partially sectioned perspective view of a mobile storage chamber incorporating one embodiment of this invention.

In the associated drawings:

FIG. 1 shows a mobile refrigerated storage chamber 1 with doors 2 in the rear portion and having an insulated container 3 for storage of liquefied refrigerant gas within chamber 1. Spray conduit means 5 are positioned within the upper portion of storage chamber 1 and extend substantially the entire length of the chamber with small openings spaced along the conduit length for discharging a multiplicity of discreate cold fluid streams into the storage chamber for refrigerating frozen product 6. Liquid discharge conduit means 7 is joined at one end to container 3 and at the other end to the inlet of heat exchange passage means 9. Vapor discharge conduit means 10 has an inlet end joined to the discharge end of said heat exchange passage means 9 and an outlet end joined to the inlet end of spray conduit means 5. Bypass conduit means 11 has an inlet end joined to the liquid discharge conduit means 7 intermediate its connection at one end to storage container 3 and its connection at the other end to heat exchange passage means 9. Said bypass conduit means 11 has its outlet end joined to the inlet end of said spray conduit means 5. Liquefied gas flow control means, comprising a temperature sensing element 14 positioned within said storage chamber 1, are connected to discharge conduit control valve 15 which is operably interposed in said liquid discharge conduit 7 intermediate said heat exchange passage means 9 inlet end and said bypass conduit means 11 inlet end. Discharge conduit control valve 15 is responsive to temperature sensing element 14, which element is in turn responsive to changes in temperature within storage chamber 1. Bypass control valve 17 is operably interposed in said bypass conduit 11 and is connected to temperature sensing element 14 to be responsive to the storage chamber temperature as sensed by such element. Enclosure means 18 is provided having walls partially surrounding and spaced from said heat exchange passage means 9. Fan means 19 are positioned adjacent to and in flow communication with said enclosure means 18 for circulating storage chamber gas therethrough and thereafter from end to end of said storage chamber 1. A water collector 21 is positioned within said storage chamber beneath said heat exchange passage means 9 and water drain 22 is joined to said water collector 21 and extends outside said storage chamber 1.

Electrical defrost means 25 are disposed in thermal contact with said heat exchange passage means 9 within the enclosure 18. Bypass conduit flow, discharge conduit flow, fan and electrical defrost control means comprising a pressure differential frost build-up sensing element 26 for sensing the pressure increase between fan 19 and heat exchange passage means 9 created by frost build-up which progressively constricts flow through the heat exchange means, and a temperature sensing element 27 within the heat exchange passage means enclosure 18 are provided to begin and end defrost cycling of the heat exchange passage means 9 on which frost build-up occurs as humidity is removed from storage chamber gas which is circulated by means of fan 19 past heat exchange passage means 9. To do this, sensing elements 26 and 27 are operably connected to said electrical defrost means 25, bypass control valve 17, discharge conduit control valve 15, and fan means 19 such that they are responsive to sensed frost build-up and defrost as controlled through electrical circuit box 29.

Figure 2:
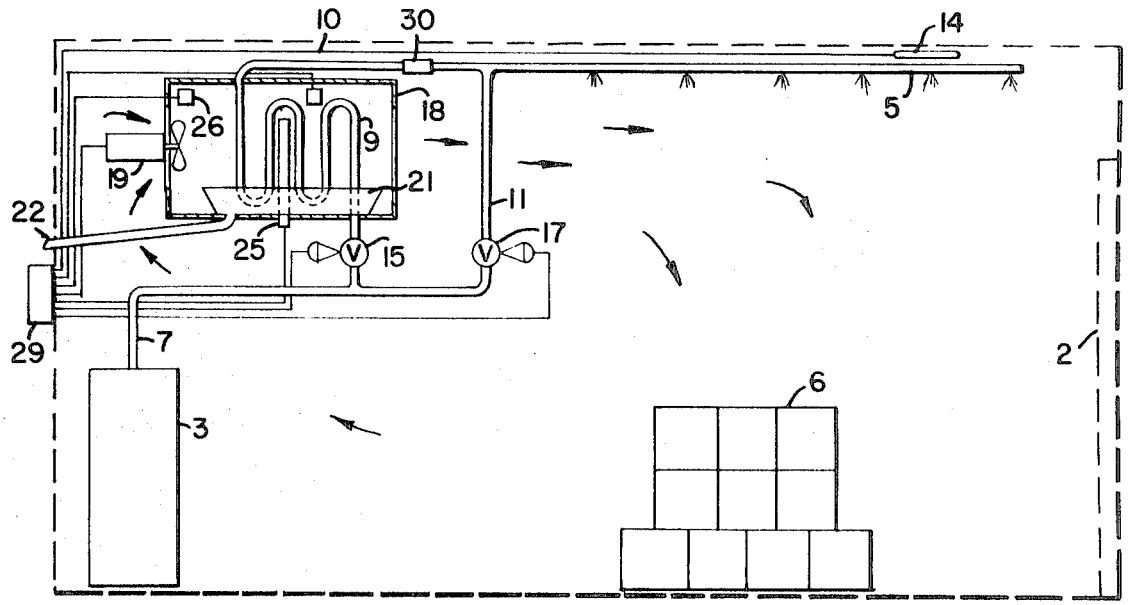
FIG. 2 is a partially sectioned schematic side view of the mobile storage chamber of FIG. 1.

FIG. 2 shows in cross-section the storage chamber and refrigeration and defrost equipment shown in FIG. 1. As can be seen, storage chamber 1 having doors 2 at the rear thereof has arranged therein frozen product 6, liquefied refrigerant gas container 3, and associated refrigeration and dehumidification equipment heretofore described. In addition to what is shown in FIG. 1 as represented in cross-section in FIG. 2, unidirection flow means 30 is introduced into vapor discharge conduit means 10 for the purpose of preventing back flow of cold refrigerant liquid into heat exchange passage means 9 during the defrost cycle. Said unidirection flow means may comprise a check valve, a hydrostatic bias means, a solenoid operated valve or venturi means. The hydrostatic bias means can comprise simply a suitable difference in elevation between vapor discharge conduit 10 and bypass conduit 11, such that conduit 10 is higher with respect to gravity than conduit 11 at the junction of conduit 11 and spray conduit means 5. In such case with a proper difference in elevation, liquid refrigerant would be hydrostatically restrained from flowing up into vapor discharge conduit 10 and back into heat exchange passage means 9. If a solenoid operated valve were used as the unidirection flow means, arranging for it to close when control valve 15 closes and to open when control valve 15 opens would prevent refrigerant back flow. A venturi device can function as a unidirection flow means if arranged such that the dynamic effects of refrigerant flow in bypass conduit 11 were by means of said venturi able to suck fluid from vapor discharge conduit 10.

Figure 3:
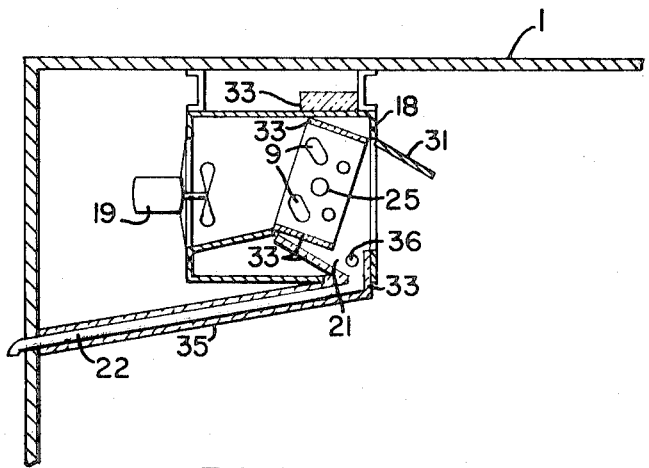
FIG. 3 is a sectioned elevation view of the dehumidifier portion of FIG. 1.

FIG. 3 shows a sectioned elevation view of the dehumidifier portion of FIG. 1. In this arrangement, a flap 31 is placed at the end of enclosure 18 opposite fan 19 and arranged such that said flap closes the open end of enclosure 18 when fan 19 is turned off. This feature is desirable because heat generated by the electrical defrost means 25, which in this figure is a cartridge type heater viewed from one end, is not allowed to convectively dissipate into refrigerated storage chamber 1. Also shown in FIG. 3 are fins which improve heat transfer from the circulated storage chamber gas to heat exchange passage means 9, which fins are spaced apart such that a significant amount of frost can build up on the fin surfaces without causing plugging of the gas flow passageway between the fins, e.g., about 0.20-inch fin spacing, and are also preferably arranged vertically to facilitate drainage of melted frost therefrom. Also shown in FIG. 3 are thermal insulation panels 33 which prevent undesired heat conduction loss which would decrease the efficiency of electrical defrost means 25. Additional thermal insulation 35 is provided around the water collector 21 and drain means 22 to prevent plugging of said drain means by freezing. For the same reason, an additional electrical heater 36 is positioned within water collector 21.

In operation of the hereinabove described refrigeration and dehumidification system, when the dehumidifier is turned on fan 19 begins immediately to circulate gas across heat exchange passage means 9 and thereafter through the storage chamber 1. As the dehumidifier operates, moisture is removed from storage chamber gas and freezes out on the heat exchange passage means surfaces. As frost accumulates on these surfaces, the pressure drop of gas blowing across the heat exchange passage means increases. Sensing element 26 detects the pressure increase and when enough frost accumulates to raise the pressure upstream of heat exchange passage means 9 to a predetermined level, for example 0.65 inch of water, electrical circuitry with electrical circuit box 29 is activated. When such activation occurs, fan 19 is turned off, electrically operated control valve 15 is closed, electrically operated control valve 17 is opened, and electrical defrost means 25 is activated to heat the heat exchange passage means and begin melting the accumulated frost therefrom. If a heating element such as 36 is employed in water collector 21, such heating element would preferably remain on continuously. During a defrost cycle, refrigerant fluid is supplied to the storage chamber 1 through bypass conduit 11 directly from refrigerant storage container 3 to spray conduit means 5. Under these conditions bypass control valve 17 is responsive to temperature sensing element 14, such that a predetermined temperature is maintained within the storage chamber. In this way, flow of refrigerant for maintaining the desired storage chamber temperature is never interrupted.

During defrosting, when electrical defrost means 25 has raised the temperature of the heat exchange passage means and associated fins to a predetermined degree, for example 50° F., then temperature sensing element 27 which is set to function at such predetermined temperature will deactivate the circuitry within circuit box 29 which was initially activated by pressure sensing element 26. When this occurs, fan 19 will be turned on, discharge control valve 15 will open, bypass control valve 17 will close and electrical defrost means 25 will be turned off. By this arrangement, refrigerant will resume flow through heat exchange passage means 9 to again remove moisture from storage chamber gas, and control valve 15 will again become responsive to temperature sensing element 14, such that refrigerant gas is fed through heat exchange passage means 9 to spray conduit 5 to regulate the desired temperature within storage chamber 1.

A preferred method of starting dehumidifier operation after the storage chamber door 2 have been open for some period of time is to start the circulating fan 19 but to delay the starting of refrigerant flow to spray conduit 5 for a time sufficient to allow the warmed storage chamber gas to melt frost which may have collected on the heat exchange passage and associated fin means. A delay time of about two minutes is usually sufficient.

Figure 4:
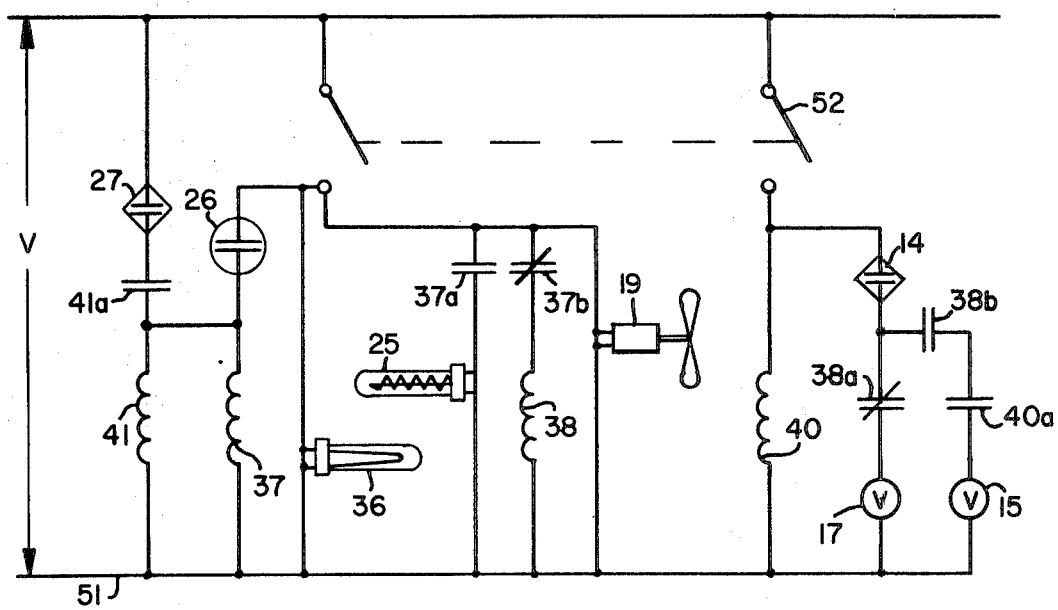
FIG. 4 is a simplified electrical diagram of the circuitry required to operate the dehumidification system shown in FIG. 2.

FIG. 4 illustrates an electrical circuit which provides the control functions heretofore described. Leads 50 and 51 are the power leads and V represents the voltage across them, which under normal circumstances would be 12-volt DC. The relay circuitry hereinafter described represents the electrical circuits which occupy electrical circuit box 29. Defrost relay 37 has contacts 37a and 37b. Defrost hold-in relay 41 has contact 41a which, once the defrost cycle is initiated by closure of pressure differential sensing means contact 26, relay 41 remains closed even after contact 26 has opened and releases only when defrost temperature sensing element 27, which has a normally closed contact, opens upon defrost temperature reaching a predetermined degree, such as 50° F. As can be seen, water collector heater 36 remains on so long as main switch 52 remains engaged. Contact 37b, which is the normally closed defrost relay contact, supplies power to the fan motor 19 and to bypass relay 38 when defrost is not operating. When defrost relay 37 is energized, contact 37b opens thereby stopping fan 19 and de-energizing bypass relay 38. At the same time, contact 37a supplies power to electrical defrost means 25.

When main switch 52 is engaged, such as after a product delivery has been made and the storage chamber doors are reclosed, time delay relay 40 prevents refrigeration from being supplied to the spray conduit means through discharge conduit valve 15 for a predetermined period of time while fan 19, which is energized by main switch 52, circuates warmed storage chamber gas past the heat exchange passage means for the purpose of using heat taken into the storage chamber by convection while the storage chamber doors are open to melt frost which may have accumulated on the heat exchange passage means. If storage chamber temperature sensing element 14 is closed and if bypass relay 38 is energized, as would be the case if frost has not built up sufficiently to cause sensing element 26 to make contact, then contact 38b will be closed. Once time delay relay 40 has functioned causing closure of contact 40a, then discharge conduit valve 15 will open responding to temperature sensing element 14 and will continue to allow refrigeration gas to flow until either storage chamber temperature sensing element contact 14 reopens or until pressure differential sensing means 26 closes. If pressure differential sensing means 26 closes due to frost build-up, then relay 37 will energize causing normally-closed contact 37b to open, which de-energizes bypass relay 38 causing contact 38b to open and 38a to close. Under these circumstances when storage chamber temperature sensing element 14 indicates a need for refrigerant flow into the storage chamber by closing its contacts, then with discharge conduit valve 15 inactivated in the closed position, bypass conduit control valve 17 will respond to the demands of temperature sensing element 14 and will permit a bypass flow of refrigerant gas to the spray conduit means, thus maintaining proper refrigeration in the storage chamber.

While this invention is most useful for frozen product intransit liquefied gas refrigeration systems, such as for trucks and trailers, it would also be useful with stationary systems. The circulating fan is usually electrically powered, but could be pneumatically powered as shown in FIG. 3 of Maurer et al., U.S. Pat. 3,492,831. Either axial flow or centrifugal type fans could be used, with axial type fans usually being preferred. Although the system will usually be used at temperatures below 32° F., it could be used at storage chamber temperatures above 32° F., such as up to about 40° F. when the heat exchanger temperature is 32° F. or below.

What is claimed is:

1. A method for frozen product refrigeration and dehumidification comprising the steps of:
   (a) providing pressurized low boiling liquefied gas having a boiling point at atmospheric pressure below about −20° F. in a thermally insulated storage container associated with a storage chamber closed from the atmosphere and holding product at least partially surrounded by a gas space;
   (b) monitoring the gas temperature within said storage chamber;
   (c) dispensing cold liquid from said storage container in response to the monitored gas temperature; heat exchanging the dispensed cold liquid with circulating warmed gas in said storage chamber to simultaneously at least partially vaporize said liquid and partially warm the resulting vapor, and condensing moisture from said gas in the form of frost while cooling said gas to temperature below about 32° F.; and spraying said at least partially vaporized liquid as a multiplicity of discrete streams into said storage chamber to maintain said monitored gas temperature in a selected temperature range of −10° F. to about 40° F.;

(d) circulating the moisture-depleted cooled gas in contact with frozen product in the storage chamber for evaporative moisture transfer to the gas and warming thereof, and refrigeration of said frozen product;

(e) recirculating the moisture-added warmed gas to the heat exchanging step (c) as said warmed gas;

(f) periodically terminating said heat exchanging of (c), directly spraying the dispensed cold liquid as said multiplicity of discrete fluid streams into said storage chamber;

(g) simultaneously with (f), melting the frost formed in (c) during the preceding heat exchanging, and collecting and discharging the melted frost from said storage chamber; and (h) after discharging said melted frost, terminating said melting of (g) and restoring said heat exchanging of (c).

2. A method according to claim 1 in which said condensed moisture is collected by gravity draining.

3. A method according to claim 1 in which the dispensed cold liquid flows in countercurrent heat exchange with the moisture-added warmed gas.

4. A method as described in claim 1 wherein said warmed gas is not circulated in said storage chamber during melting step (d).

5. In a system for the intransit refrigeration and dehumidification of frozen product, an apparatus comprising in combination:

(a) a storage chamber for said frozen product;

(b) a thermally-insulated container associated with the storage chamber for storing pressurized low boiling liquefied gas having a boiling point at atmospheric pressure below about −20° F.;

(c) spray conduit means positioned within the upper portion of said storage chamber and extending substantially the entire length thereof with openings spaced along the conduit for discharging a multiplicity of discrete cold fluid streams into the storage chamber for refrigerating the frozen product;

(d) liquid discharge conduit joined at one end to said container;

(e) heat exchange passage means having an outlet end joined to the other end of said liquid discharge conduit means;

(f) vapor discharge conduit means having an inlet end joined to the discharge end of said heat exchange passage means and having an outlet end joined to said spray conduit means;

(g) bypass conduit means having an inlet end joined to the liquid discharge conduit means intermediate said one end of (d) and said other end of (e), said bypass conduit means having an outlet end joined to the inlet end of said spray conduit means;

(h) liquefied gas flow control means comprising a temperature sensing element positioned within said storage chamber, a discharge conduit control valve operably interposed in said liquid discharge conduit intermediate said other end and said bypass conduit means inlet end being connected to said temperature sensing element to be responsive to the storage chamber temperature as sensed by such element, (i) a bypass control valve operably interposed in said bypass conduit being connected to the temperature sensing element of (h) to be responsive to the storage chamber temperature as sensed by such element;

(j) enclosure means having walls partially surrounding and spaced from said heat exchange passage means;

(k) fan means positioned adjacent to and in flow communication with said enclosure means for circulating gas therethrough and thereafter substantially from end-to-end of said storage chamber;

(l) a water collector positioned within said storage chamber beneath the heat exchanger passage means;

(m) water drain means joined to said water collector and extending to outside said storage chamber;

(n) electrical defrost means disposed in contact with said heat exchange passage means;

(o) bypass conduit flow, discharge conduit flow, fan and electrical defrost control means comprising a frost build-up sensing element and a temperature sensing element within the heat exchange passage means enclosure, which sensing elements are operably connected to said electrical defrost means, bypass control valve, discharge conduit control valve and fan means, such that they are responsive to sensed frost build-up which is sensed by said frost build-up sensing element and which initiates defrosting, and they are responsive to defrost sensed by said temperature sensing element which terminates defrosting.

6. A system as described in claim 5 wherein unidirection flow means are positioned within the vapor discharge conduit means intermediate the heat exchange passage means discharge end and the junction of said vapor discharge conduit and the bypass conduit means.

7. A system as described in claim 5 wherein the frost build-up sensing element described in part (o) comprises a pressure differential activated electrical switch.

8. A system as described in claim 5 wherein the temperature sensing element described in part (o) comprises a temperature actuated electrical switch.

9. A system as described in claim 6 wherein the unidirectional flow means comprises a check valve.

10. A system as described in claim 6 wherein the unidirectional flow means comprises an electrically operated valve which is responsive to the control means of part (o).

References Cited

UNITED STATES PATENTS

| | | | |
|---|---|---|---|
| 3,239,360 | 3/1966 | Dixon | 62—64 X |
| 3,287,925 | 11/1966 | Kane et al. | 62—64 X |
| 3,491,547 | 1/1970 | Watkins | 62—514 X |
| 3,492,831 | 2/1970 | Maurer et al. | 62—62 |

MEYER PERLIN, Primary Examiner

R. C. CAPOSSELA, Assistant Examiner

U.S. Cl. X.R.

62—156, 200, 514